US011298710B2

(12) United States Patent
Rachow

(10) Patent No.: US 11,298,710 B2
(45) Date of Patent: Apr. 12, 2022

(54) DUAL MEDIA NOZZLE

(71) Applicant: A. Raymond et Cie, Grenoble (FR)

(72) Inventor: Larry Michael Rachow, Lenox, MI (US)

(73) Assignee: A. Raymond et Cie, Grenoble (FR)

( * ) Notice: Subject to any disclaimer, the term of this patent is extended or adjusted under 35 U.S.C. 154(b) by 131 days.

(21) Appl. No.: 16/110,738

(22) Filed: Aug. 23, 2018

(65) Prior Publication Data

US 2020/0061643 A1 Feb. 27, 2020

(51) Int. Cl.
  *B05B 7/08* (2006.01)
  *B05B 1/14* (2006.01)
  *B60S 1/56* (2006.01)

(52) U.S. Cl.
  CPC .............. *B05B 7/0892* (2013.01); *B05B 1/14* (2013.01); *B60S 1/56* (2013.01)

(58) Field of Classification Search
  CPC ... B05B 7/0408; B05B 7/0416; B05B 7/0483; B05B 7/0892; B05B 1/10; B05B 1/14; B08B 3/02; B08B 5/02; B60S 1/52; B60S 1/54; B60S 1/56
  USPC ......... 239/284.2, 304, 306, 421; 134/36, 50, 134/94.1–103.3, 171, 199
  See application file for complete search history.

(56) References Cited

U.S. PATENT DOCUMENTS

| 336,642 | A | * | 2/1886 | Harder | .................. | E03C 1/0408 |
| | | | | | | 4/601 |
| 5,571,562 | A | * | 11/1996 | Wakat | ..................... | B05B 7/066 |
| | | | | | | 118/315 |
| 9,180,840 | B2 | | 11/2015 | Tanaka et al. | | |
| 9,278,670 | B2 | | 3/2016 | Hattori et al. | | |
| 9,480,994 | B2 | * | 11/2016 | Shankar | .................. | B05B 1/207 |
| 9,625,714 | B2 | | 4/2017 | Rousseau | | |
| 9,663,073 | B2 | | 5/2017 | Tanaka et al. | | |
| 9,783,167 | B2 | | 10/2017 | Niemczyk | | |
| 9,796,361 | B2 | | 10/2017 | Gokan et al. | | |

(Continued)

FOREIGN PATENT DOCUMENTS

| JP | 1996-123387 | * | 1/1996 | ........... B05B 7/0846 |
| WO | 2015157744 A1 | | 10/2015 | |

OTHER PUBLICATIONS https://patents.google.com/patent/JPH0819749A/en?q=paint&inventor=MURAI+AKIFUMI, Murai, Akifumi, Annular Coating Gun, Jan. 23, 1996, Google patents translation of JPH0819749.*

*Primary Examiner* — Darren W Gorman
(74) *Attorney, Agent, or Firm* — Warner Norcross + Judd LLP

(57) ABSTRACT

A dual media spray nozzle assembly for cleaning an optical viewer or sensor lens is disclosed. The assembly includes two media pathways that terminate in two arrays at the target cleaning area. The nozzle arrays are coplanar. The two media may be activated sequentially or simultaneously. The assembly includes a cover, a spray element, and a media inlet body. The nozzles are formed in a curved, semi-annular opening of the spray element. The spray element includes front and back sides. Formed on the front side is a first media flow path associated with a first media inlet formed on the media inlet body. The first media flow path is associated with the first array of nozzles. Formed on the back side is a second media flow path associated with second media inlets formed on the media inlet body. The second media path is associated with the second array of nozzles.

13 Claims, 6 Drawing Sheets

(56) References Cited

U.S. PATENT DOCUMENTS

| | | |
|---|---|---|
| 10,328,906 B2 | 6/2019 | Hester et al. |
| 2013/0068852 A1* | 3/2013 | Wurz .................... B01F 5/0405 239/8 |
| 2016/0103316 A1 | 4/2016 | Rousseau |
| 2017/0225660 A1 | 8/2017 | Trebouet et al. |
| 2017/0313286 A1 | 11/2017 | Galera et al. |
| 2018/0086316 A1 | 3/2018 | Trebouet et al. |
| 2019/0100171 A1 | 4/2019 | Ina et al. |
| 2019/0116296 A1 | 4/2019 | Romack et al. |
| 2019/0202410 A1 | 7/2019 | Zhao et al. |
| 2019/0232315 A1 | 8/2019 | Ehteshami et al. |
| 2019/0232923 A1 | 8/2019 | Tokunaka |
| 2019/0270433 A1 | 9/2019 | Hester |
| 2019/0283715 A1 | 9/2019 | Sakai |
| 2019/0314865 A1 | 10/2019 | Sevak et al. |
| 2019/0381975 A1 | 12/2019 | Caillot et al. |

\* cited by examiner

DUAL MEDIA NOZZLE

TECHNICAL FIELD

The disclosed inventive concept relates generally to spray nozzles used for the cleaning of articles such as camera lenses and sensors. More particularly, the disclosed inventive concept relates to a dual media nozzle having a cover, a spray element, and a media inlet body. A first media, such as a fluid, is emitted from a first array of spray nozzles. A second media, such as air, is emitted from a second array of spray nozzles. The nozzles are preferably coplanar and have separate media inlets and pathways.

BACKGROUND OF THE INVENTION

It is increasingly common in vehicles to incorporate one or more externally-mounted optical viewers, such as digital cameras, to allow the vehicle operator to more completely view the vehicle's immediate environment. Such optical viewers are most commonly employed as back-up cameras for the automotive vehicle, but are also found in a broad variety of vehicles including, without limitation, buses, trucks and construction equipment. Optical viewers are also finding use in railed vehicles used both for public transportation as well as for the movement of cargo. These types of viewers are also being employed in watercraft. It is also increasingly common in vehicles to incorporate one or more sensors, such as light detection and ranging (LIDAR), radar, night vision, and lane departure sensors, to allow the vehicle operator to more completely view the vehicle's immediate environment. Such sensors are most commonly employed as driver assist systems for the automotive vehicle, but are also found in a broad variety of vehicles including, without limitation, autonomous vehicles, buses, trucks and construction equipment. Sensors are also finding use in railed vehicles used both for public transportation as well as for the movement of cargo. These types of sensors are also being employed in watercraft.

One of the great challenges associated with the use of optical viewers and sensors, particularly as used in automotive vehicles, is the requirement of having to keep the lens free of dirt and debris. It is not always practical or convenient for the operator to stop the vehicle to clean a dirty lens. Dirty lenses may pose a considerable safety hazard as the driver, who may have grown dependent upon the camera for backing up for example, may not be accustomed to backing up the vehicle without the assistance of such systems. With the number of multiple optical viewers and sensors increasing on the vehicle and with a limited amount of cleaning fluid that may be stored in the vehicle, a second media, such as air, is also needed to help with the efficient cleaning of all the lenses.

It is known to adapt spray systems to automobiles to clean class surfaces. One such effort is set forth in EP 0 830 996 B1 which teaches two spray nozzles disposed in a common module. According to this reference, the spray nozzles are alternately supplied with washing fluid from a common washing fluid supply chamber. Washing systems are also known having spray nozzles that deliver a cleaning solution in a misted form relying upon very small droplets, such as systems disclosed in U.S. Pat. Nos. 5,860,603 and 4,463,904. However, such systems re not readily adaptable for use in the cleaning of lenses used in optical systems mounted on automotive vehicles, such as vehicle cameras.

Known systems for cleaning camera lenses used in the automotive vehicle are often overly complex and impractical for broad application. Accordingly, and as is the case in many industries, improvements in the technology related to the maintenance of optical instruments are necessary to make such systems more widely accepted and, perhaps most importantly, safer for general use.

SUMMARY OF THE INVENTION

The disclosed inventive concept overcomes the problems associated with known cleaning systems for use with optical viewers and sensors such as back-up cameras and LIDAR used on vehicles. The disclosed inventive concept provides a dual media nozzle assembly for mounting in association with the optical viewer or sensor. The dual media nozzle assembly includes two discrete media pathways that terminate in two arrays at the surface to be cleaned. The nozzle arrays are preferably coplanar. The two media may be sprayed sequentially or simultaneously as may be desired.

The dual media nozzle assembly includes a cover, a spray element, and a media inlet body. The spray element is sandwiched between the cover and the inlet body. The coplanar arrays of nozzles are formed in the spray element. The inventive concept can be secured to or integrated with the lens housing of the optical device or mounted to an alternative structure so that the media arrays terminate on the surface to be cleaned.

The spray element includes a front side and a back side. Formed on the front side of the spray element is a first media flow path that is fluidly associated with a first media inlet formed on the media inlet body. The first media flow path is fluidly associated with the first array of nozzles. Formed on the back side of the spray element is a second media flow path that is fluidly associated with a pair of spaced apart second media inlets formed on the media inlet body. The second media flow path is associated with the media inlet body.

In operation, the first media flows from the first array of spray nozzles and the second media flows from the second array of spray nozzles. As noted, the media may spray simultaneously or sequentially. Both spray nozzle arrays are configured so as to direct the flow to the surface being cleaned, such as to the center of the lens of an optical device.

The disclosed inventive concept provides an efficient and practical response to the need to keep the lens of an optical device or sensor, such as a vehicle back-up camera or LIDAR, free of dirt and debris without the need for the vehicle operator to exit the vehicle. The disclosed dual media nozzle assembly may be adapted for use in a broad variety of applications.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

As those of ordinary skill in the art will understand, various features of the embodiments illustrated and described with reference to any one of the figures may be combined with features illustrated in one or more other figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

The figures illustrate a dual media nozzle assembly according to the disclosed inventive concept. The figures illustrate the dual media nozzle assembly in its assembled condition and its exploded condition. In addition, a single component is illustrated. It is to be understood that the overall shape and design of the illustrated dual media nozzle assembly as shown are suggestive and are not intended as being limiting. In addition, the overall shapes and designs of the individual components of the dual media nozzle assembly of the disclosed inventive concept are also suggestive and are not intended as being limiting. For example, a single pathway is shown for introducing one media into the nozzle assembly and two pathways are shown for introducing the other media into the nozzle assembly. Both of these numbers may be varied to meet a particular application. Furthermore, the curved, semi-annular ring that defines the curved sprayer may be sized as required to meet a particular need depending on the size of the article to be cleaned, such as a camera lens.

Figure 1:
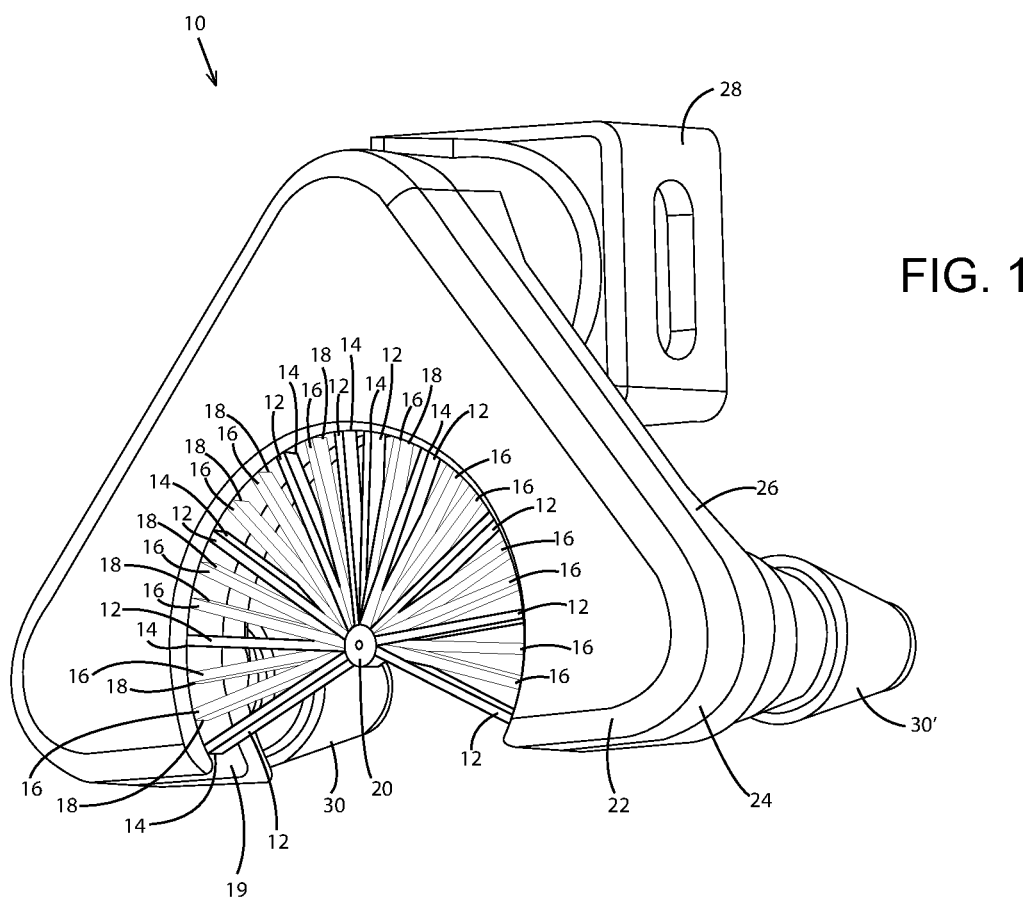
FIG. 1 is a perspective view of a dual media nozzle assembly according to the disclosed inventive concept.

Referring to FIG. 1, a perspective view of a dual media nozzle assembly according to the illustrated concept is shown. The dual media nozzle assembly, generally illustrated as 10, is adapted for use in relation to a camera lens or sensor, though the dual media nozzle assembly 10 of the disclosed inventive concept may be positioned adjacent a broad variety of articles that require a convenient and cost-effective approach to cleaning.

The step of cleaning of the article such as a lens is achieved by a plurality of nozzles that direct the spray of two types of media at the target cleaning area of the article. The different media may be applied simultaneously or alternatingly. For example, if one media is fluid and the other is air, the fluid media is sprayed first followed by air to dry the target area. An alternative pattern is possible, such as having the air media first loosen the dirt on the article, followed by the fluid, followed thereafter by another spray of air.

The dual media nozzle assembly 10 provides two discrete fluid flow paths formed by separate fluid inlets, separate internal pathways, and separate nozzles. While a number of flow patterns may be adopted, a preferred flow pattern is illustrated in FIG. 1 in which a first media 12 is emitted from a first array of spray nozzles 14 and a second media 16 is emitted from a second array of spray nozzles 18. The first array of nozzles 14 and the second array of spray nozzles 18 are integrated so as to correctly distribute the associated media and are formed in a curved sprayer 19. The curved sprayer 19 may be of a variety of shapes, but is preferably a semi-annular ring as illustrated. It is to be also understood that while the curved configuration of the curved sprayer 19 is preferred, it is possible that other shapes of the sprayer may be possible, including, without limitation, square or rectangular. The shape of the sprayer is determined by the shape of the surface to be cleaned. As illustrated, the first array of spray nozzles 14 and the second array of spray nozzles are preferably coplanar. While not mandatory, by forming the spray nozzles on the same plane, a more efficient cleaning and rinsing pattern is established. In addition, the spray nozzles may be non-planar depending on the thickness of one or more of the components of the dual media nozzle assembly 10.

The first array of spray nozzles 14 and the second array of spray nozzles 18 are arranged around a central axis. Only upon exiting the dual media nozzle assembly 10 do the two media 12 and 16 actually or potentially comingle at the approximate center illustrated as center point or cleaning target area 20 in FIG. 1. As noted above, the two media 12 and 16 may be sprayed simultaneously or alternatingly. The cleaning target area 20 is the target area on the lens to be cleaned.

The dual media nozzle assembly 10 illustrated in FIG. 1 includes a cover 22, a spray element 24, and a media inlet body 26.

The spray element 24 is sandwiched between the cover 22 and the media inlet body 26. Extending from the media inlet body 26 is a first media inlet 28 for receiving a first media from a first media reservoir (not illustrated) and a pair of second media inlets 30 and 30' for receiving a second liquid media from a second liquid media reservoir such as a compressor or air tank (not illustrated). It is to be understood that the shape and dimension of the dual media nozzle assembly 10 in its entirety and the shapes and dimensions of the cover 22, the spray element 24, and the media inlet body 26 may be other than those illustrated throughout the figures.

Figure 2:
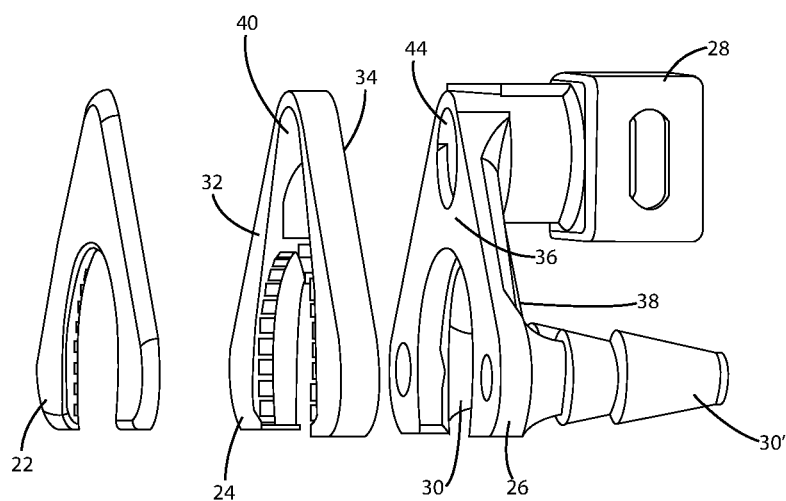
FIG. 2 is an exploded perspective view of the dual media nozzle assembly illustrated in FIG. 1.
Figure 3:
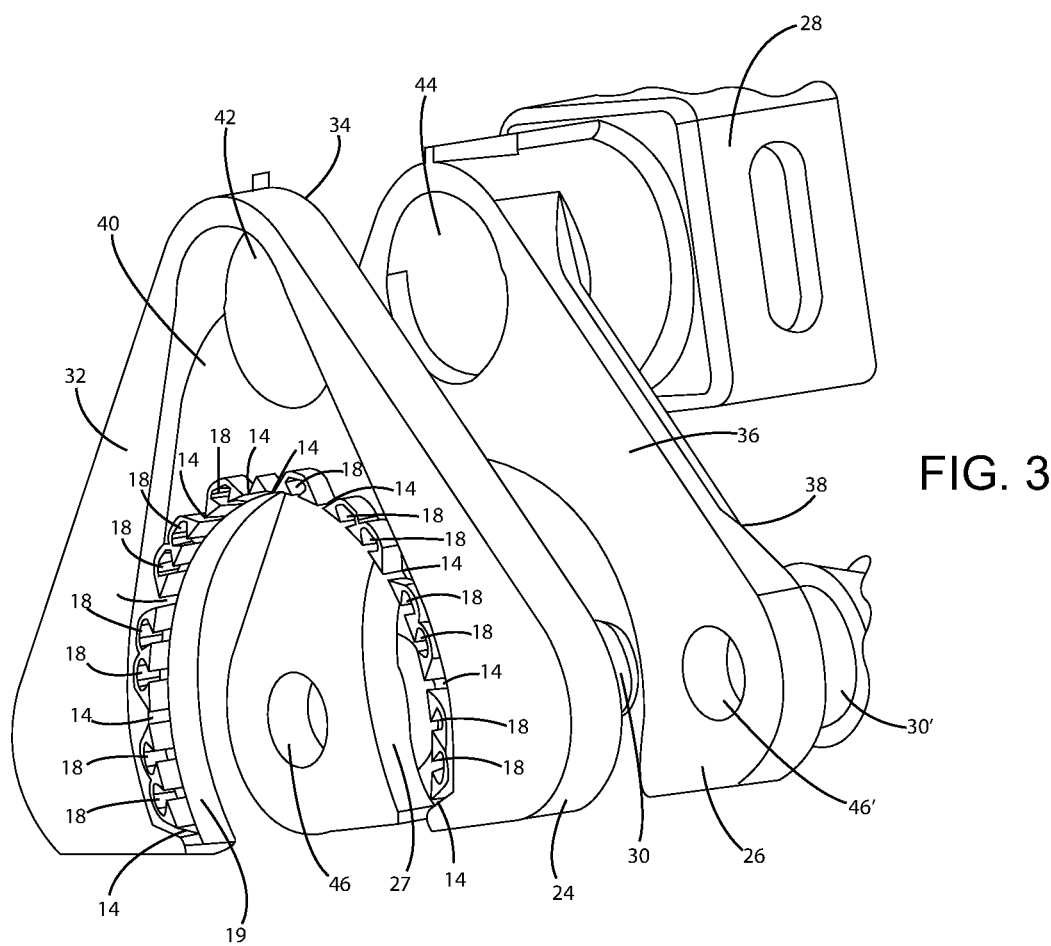
FIG. 3 is a perspective view of the spray element in spaced apart relation to the media inlet body.

FIG. 2 is an exploded perspective view of the dual media nozzle assembly 10 in which the cover 22, the spray element 24, and the media inlet body 26 are shown in relation to each other. FIG. 3 is similar to FIG. 2 but illustrates only the spray element 24 and the media inlet body 26. With reference to both FIG. 2 and FIG. 3, the spray element 24 includes a front side 32 and a back side 34. The references "front" and "back" are used herein only for clarity and are not intended as being restrictive. The media inlet body 26 includes an outlet side 36 and a fluid inlet side 38. The first media inlet 28 and the second media inlets 30 and 30' extend from the fluid inlet side 38 of the media inlet body 26.

Formed in the front side 32 of the spray element 24 is a first media flow path 40. The first media flow path 40 is fluid communication with a first media flow path passageway 42 formed through the spray element 24. A first media flow aperture 44 is formed through the media inlet body 26 and is continuous with the first media inlet 28. The cover 22 provides a tight seal over the front side 32 of the spray element 24. The tight seal formed by the cover 22 assures that the first media flowing through the first media flow path 40 can only exit the first array of spray nozzles 14 and is not able to spill over into the second array of spray nozzles 18. An appropriate gasket material or attachment process (not shown) may thus be provided between the cover 22 and the spray element 24. Similarly, an appropriate gasket material or attachment process (not shown) may also be provided between the spray element 24 and the media inlet body 26.

Figure 4:
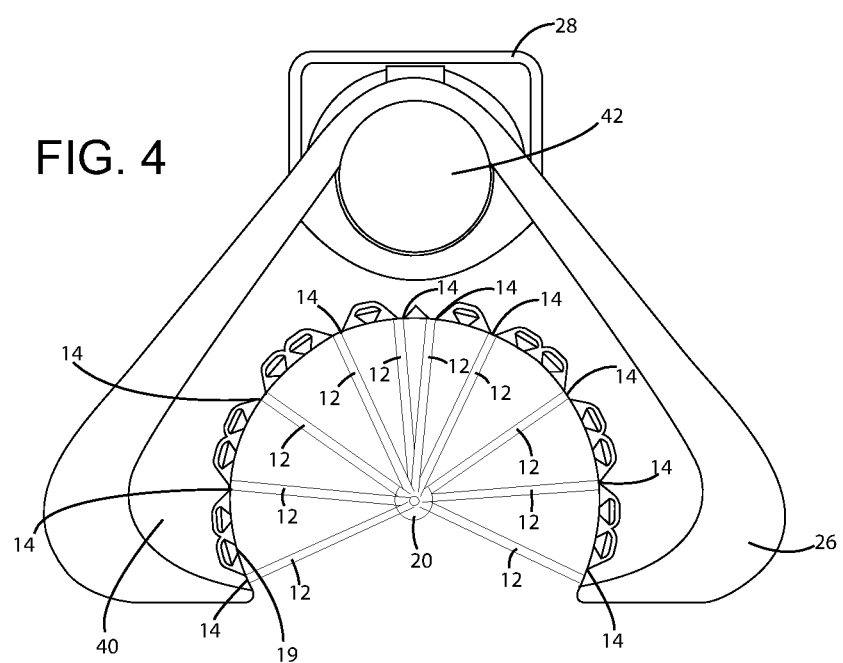
FIG. 4 is a view of one side of the spray element illustrating a first media flow path and the direction of travel of a first media being sprayed via the first media flow path.

According to this arrangement, the first media flows from the first media reservoir (not shown), into the first media inlet 28, through the first media flow aperture 44, into and through the first media flow path passageway 42, into and through the first media flow path 40, and out of the first array of spray nozzles 14. The flow pattern created by the first media exiting the first array of spray nozzles 14 is illustrated in FIG. 4 in which the first media 12 is shown being emitted from the first array of spray nozzles 14 toward the cleaning target area 20.

With respect to the flow of the second media, FIG. 3 illustrates a pair of second media flow apertures 46 and 46' formed through the media inlet body 26. The second media flow aperture 46 is continuous with the second media inlet 30 and the second media flow aperture 46' is continuous with the second media inlet 30'.

Figure 5:
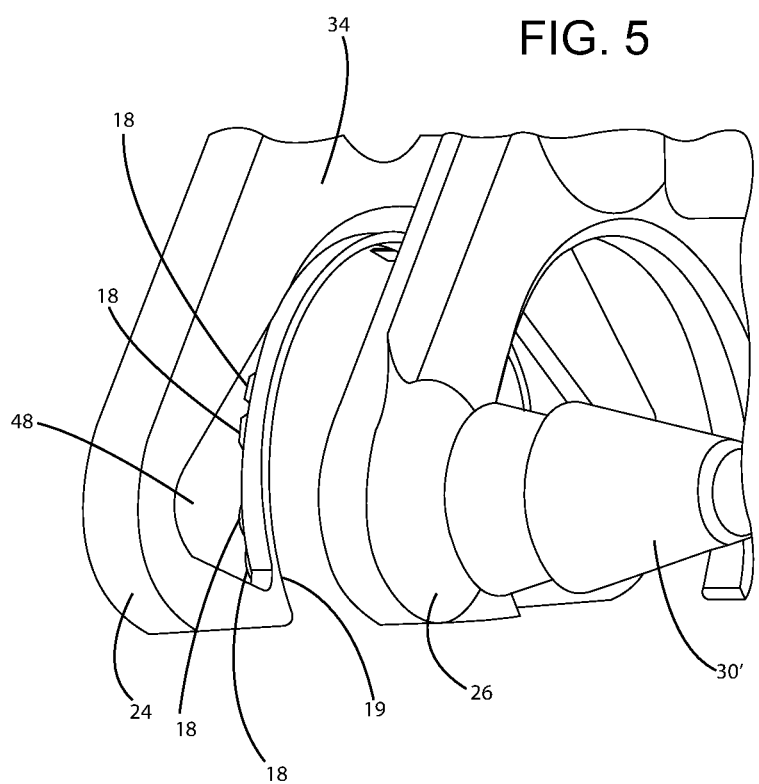
FIG. 5 is a partial perspective view of the other side of the spray element illustrating a second media flow path with the spray element being shown in relation to the media inlet body, the second media flowing from the illustrated side of the spray element through the spray element and out of the nozzles.
Figure 6:
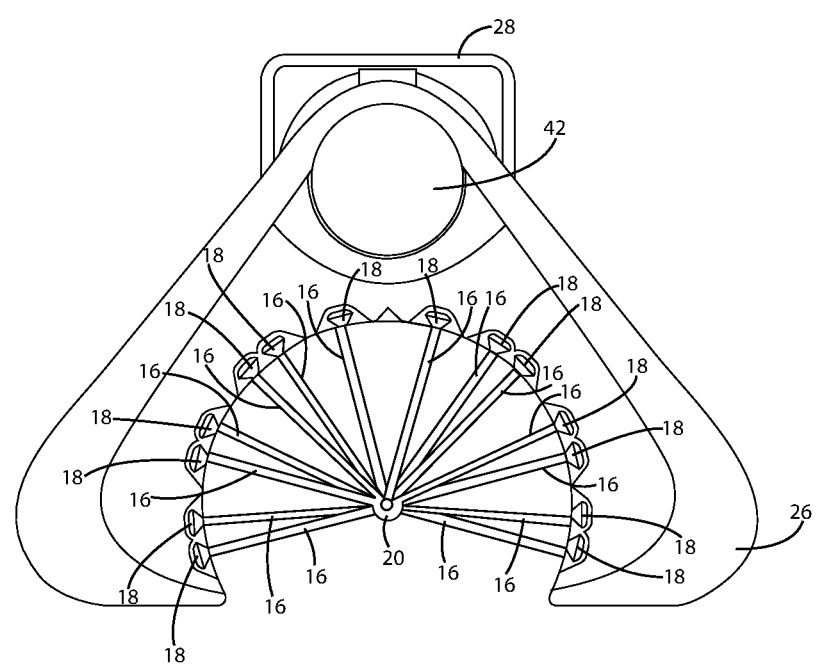
FIG. 6 is a view of the same side of the spray element shown in FIG. 4 but illustrating the direction of travel of the second media being sprayed, the second media flowing from the opposite side of the spray element.

As shown in FIG. 5, formed on the back side 34 of the spray element 24 is a second media flow path 48. The second media flow path is continuous with the second media flow apertures 46 and 46'. The second array of spray nozzles 18 is open to the second media flow path 48. According to this arrangement, the second media flows from the second media reservoir (not shown), into the second media inlets 30 and 30', through the second media flow apertures 46 and 46', into and through the second media flow path 48, and out of the second array of spray nozzles 18. The flow pattern created by the second media exiting the second array of spray nozzles 18 is illustrated in FIG. 6 in which the second media 16 is shown being emitted from the second array of spray nozzles 18 toward the cleaning target area 20.

The dual media nozzle assembly 10 described above and illustrated in the attached figures is highly adaptable for several applications beyond use in cleaning a camera and sensor lens. It provides a cost-effective and practical solution to the need in the art for an efficient lens-cleaning arrangement. In addition to the media being sprayed either simultaneously or sequentially, it is possible to include a pulsing pump for either one or both of the media so as to create a tunable spray flow, one that may be pulsed for improved and more efficient washing or rinsing. As noted above, several variations are possible without deviating from the spirit or scope of the disclosed inventive concept, including altering the nozzle arrangement.

One skilled in the art will readily recognize from such discussion, and from the accompanying drawings and claims that various changes, modifications and variations can be made therein without departing from the true spirit and fair scope of the invention as defined by the following claims.

LIST OF REFERENCE NUMERALS

10 Dual media nozzle assembly
12 First media
14 First array of outlets
16 Second media
18 Second array of outlets
19 Curved sprayer
20 Cleaning target area
22 Cover
24 Spray element
26 Media inlet body
27 Arcuate surface
28 First media inlet
30 Second media inlet
30' Second media inlet
32 Front side
34 Back side
36 Fluid outlet side
38 Fluid inlet side
40 First media flow path
42 First media flow path passageway
44 First media flow aperture
46 Second media flow aperture
46' Second media flow aperture
48 Second media flow path

What is claimed is:

1. A spray nozzle comprising:
   a cover;
   an inlet portion having a first media inlet for a first media and a second media inlet separate from the first media inlet for a second media different from the first media; and
   a spray element sandwiched between the cover and the inlet portion, the spray element including a first media flow path in communication with the first media inlet and a second media flow path in communication with the second media inlet, the spray element having a first array of spray nozzles in communication with the first media flow path and a second array of spray nozzles in communication with the second media flow path;
   wherein the spray element has semi-annular surface between a front side of the spray element and a back side of the spray element that is opposite the front side, the semi-annular surface including the first and second array of spray nozzles, the first array of spray nozzles being co-planar with the second array of spray nozzles in a circumferential direction of the semi-annular surface, the first media flow path being a recess formed in the front side of the spray element and being sealed by the cover, and the second media flow path being formed on the back side of the spray element.

2. The spray nozzle of claim 1, wherein the first array of spray nozzles associated with the first media flow path and the second array of spray nozzles associated with the second media flow path are integrated.

3. The spray nozzle of claim 1, wherein the first media inlet and the second media inlet are formed on a media inlet body.

4. The spray nozzle of claim 3, wherein the media inlet body includes a fluid inlet side and a fluid outlet side, the fluid inlet side having the first media inlet formed thereon and the second media inlet formed thereon.

5. The spray nozzle of claim 3, wherein the media inlet body is adapted for attachment to the back side of the spray element and wherein the spray element includes a first media flow path passageway formed therethrough, the first media inlet of the media inlet body being in fluid communication with the first media flow path passageway.

6. The spray nozzle of claim 5, wherein the cover is adapted for attachment to the front side of the spray element.

7. A liquid spray cleaner for cleaning an article, the cleaner comprising:
   a cover;
   an inlet portion having a first media inlet for a first media and a second media inlet separate from the first media inlet for a second media different from the first media;
   a spray element having an opening for placement relative to the article to be cleaned, the opening having a curved sprayer, the curved sprayer including a semi-annular surface having outlets for the first media and outlets for the second media, whereby the first media and the second media from the outlets is centrally directed to the article to be cleaned, the spray element including a first media flow path in communication with the outlets for the first media and a second media flow path in communication with the outlets for the second media, wherein the outlets include a first array of spray nozzles for the first media and a second array of spray nozzles for the second media, the first array of spray nozzles being co-planar with the second array of spray nozzles in a circumferential direction of the semi-annular surface;

wherein the first and second media inlets are associated with the first media flow path and the second media flow path, respectively; and wherein the spray element has a front side and a back side opposite the front side, the first media flow path being a recess formed in the front side of the spray element and being sealed by the cover, and the second media flow path being formed on the back side of the spray element.

8. The liquid spray cleaner for cleaning an article of claim 7, the first media flow path and the second media flow path being separate from one another.

9. The liquid spray cleaner for cleaning an article of claim 7, wherein the outlets for the first media and the outlets for the second media are integrated.

10. A spray nozzle comprising:
a cover;
a first media inlet for a first media;
a second media inlet separate from the first media inlet for a second media different from the first media;
a first array of spray nozzles;
a second array of spray nozzles separate from the first array of spray nozzles, the first and second array of spray nozzles being defined in a semi-annular surface and being co-planar in a circumferential direction of the semi-annular surface; and
a body having a first media flow path and a second media flow path, wherein the first media flow path connects the first media inlet to the first array of spray nozzles and the second media flow path connects the second media inlet to the second array of spray nozzles;
wherein the body has a front side and a back side opposite the front side, the first media flow path being a recess formed in the front side of the body and being sealed by the cover, and the second media flow path being formed on the back side of the body.

11. The fluid spray cleaner of claim 10, wherein the first array of spray nozzles and the second array of spray nozzles are adjacent one another.

12. A spray nozzle comprising:
a cover;
an inlet portion having a first media inlet for a first media and having a second media inlet separate from the first media inlet for a second media different from the first media; and
a spray element sandwiched between the cover and the inlet portion, the spray element having a first array of spray nozzles in communication with the first media inlet and a second array of spray nozzles in communication with the second media inlet;
wherein the spray element has a semi-annular surface between a front side of the spray element and a back side of the spray element, the semi-annular surface including the first array of spray nozzles and the second array of spray nozzles, the first array of spray nozzles and the second array of spray nozzles being co-planar a circumferential direction of the semi-annular surface,
wherein a first media flow path is formed as a recess in the front side of the spray element and is sealed by the cover to interconnect the first media inlet and the first array of spray nozzles, and wherein a second media flow path is formed on the back side of the spray element and interconnects the second media inlet and the second array of spray nozzles.

13. The spray nozzle of claim 1, wherein the spray nozzle is further defined as a spray nozzle assembly, and wherein the cover, the inlet portion, and the spray element are separate components coupled together to form the spray nozzle assembly.

* * * * *